June 15, 1926.
W. D. FALL
1,589,136
AUTOMOBILE ROAD MAP ROLL
Filed April 11, 1925
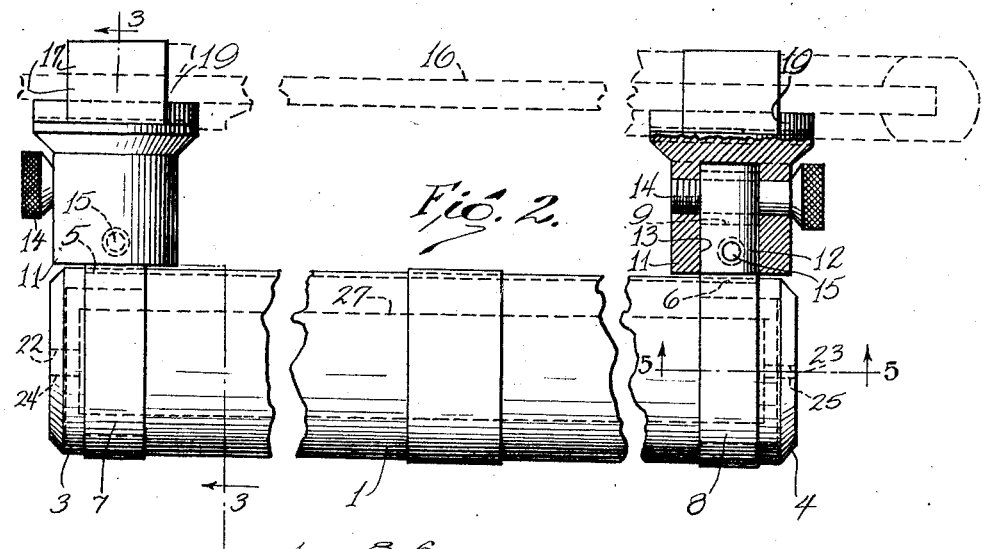
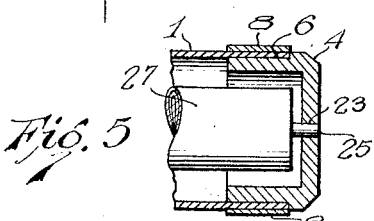
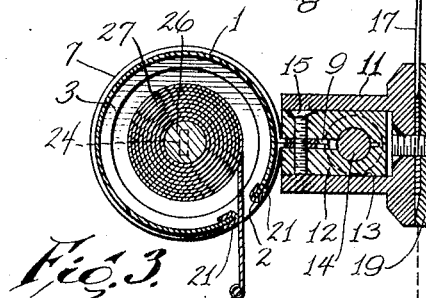
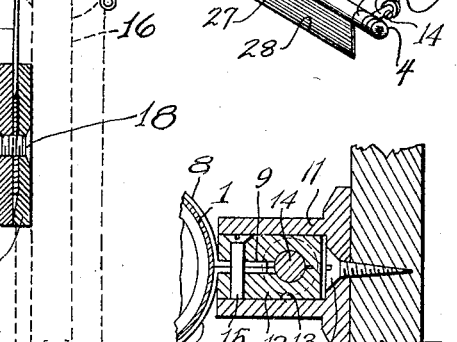
INVENTOR
W. D. FALL
BY
ATTORNEYS Patented June 15, 1926.

1,589,136

UNITED STATES PATENT OFFICE.

WALTER D. FALL, OF INDIANAPOLIS, INDIANA.

AUTOMOBILE ROAD-MAP ROLL.

Application filed April 11, 1925. Serial No. 22,463.

My invention relates to improvements in automobile road map rolls, and it consists in the combinations, constructions, and arrangements herein described and claimed.

An object of my invention is to provide an automobile road map roll which is especially designed to be removably secured to the windshield of a touring car or to the frame of a closed car.

A further object of my invention is to provide a device of the type described which is compact in construction and durable and efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a perspective view of the device, Figure 2 is an enlarged detail top plan view of the device, portions thereof being shown in section, Figure 3 is a section along the line 3—3 of Figure 2.

Figure 4 is a sectional view illustrating a different mode of attachment, and

Figure 5 is a sectional view along the line 5—5 of Figure 2.

In carrying out my invention I provide a casing 1 that is circular in cross section and has a slot 2 running the entire length of the casing. End plates 3 and 4 are secured to the ends of the casing 1 and are provided with reduced portions 5 and 6 that are received within the casing 1. The ends 3 and 4 are clamped in place by means of bands 7 and 8. In Figure 3 I show the ends of each of the bands as being bent so as to abut one another. The ends 9 of each of the bands are secured to each other by a special clamping means now to be described.

In Figures 2 and 3, it will be seen that the means for securing the bands to the supporting bases 11 comprises a band clamping member 12. The member 12 is received within a recess 13 in the base 11 and is secured in place by means of a screw 14. The ends 9 of the bands are secured to the member 12 by means of a screw 15. It will be noted from Figure 3 that the member 12 is split so as to permit the two portions of the member to be moved toward each other when the screw 15 is tightened, whereby the ends 9 are clamped in place. When the device is secured to a windshield 16, clips 17 are provided and are secured to the bases 11 by means of screws 18. The screws 18 also secure shock absorbing pads 19 to the bases 11. The pads 19 bear against the windshield and steady the device. The ends of the clips 17 which are secured to the bases 11 are disposed between the pads 19 and the bases.

From the foregoing description of the various parts of the device, the operation thereof may be readily understood. In Figure 1, I show the casing 1 as being provided with reenforcing bands 20, while in Figure 3 I show the sides of the slot 2 as being provided with reenforcing strips 21. The end 3 has a non-circular shaped opening 22 therein, while the end 4 has a circular shaped opening 23 therein. The openings 22 and 23 are adapted to receive the non-circular end 24 and the circular end 25 of a roller 26. A map 27 is secured to the roller 26 and is wound thereon as shown in Figure 3. The free end 28 of the map extends through the slot 2 and the driver of the car may grasp this free end and pull downwardly so as to bring the entire map into view. The roller 26 is preferably of the standard spring type which is adapted to wind the map thereon when the spring is released in the ordinary manner. The map has imprinted thereon the highways for automobile traffic. The driver can find out his whereabouts by consulting the map, and after doing so can release the roller whereby the map will be carried back into the casing 1 where it is out of the way. As heretofore stated, the device is secured to the windshield where it is accessible by the driver. In case the device is used in a closed car, the screws 18, pads 19, and clips 17 are discarded, and wood screws 50 are inserted in the openings in the holders 11 and are screwed into the frame 51 of the closed car. The heads of the wood screws are received in countersunk recesses communicating with the openings.

I claim:

1. A device of the type described comprising a casing, ends carried by said casing, bands for supporting said casing and for securing said ends to said casing, and means for clamping the ends of each band so as to cause each band to frictionally engage with the casing.

2. A device of the type described comprising a casing, ends carried by said casing, bands for supporting said casing and for securing said ends to said casing, and means for clamping the ends of each band so as to cause each band to frictionally engage with the casing, said means comprising a band clamping member, casing supporting bases adapted to carry said clamping members, and shock absorbing pads carried by said bases and being adapted to bear against the surface to which the device is secured, and means for securing said device to the supporting surface.

WALTER D. FALL.